Patented Mar. 28, 1950

2,501,654

UNITED STATES PATENT OFFICE 2,501,654

RUBBER CEMENT

Stewart L. Brams, Dayton, Ohio, assignor to General Motors Corporation, Detroit, Mich., a corporation of Delaware No Drawing. Application April 3, 1946,
Serial No. 659,433

3 Claims. (Cl. 260—27)

This invention relates to rubber cement and is particularly concerned with alcoholic dispersions of rubber.

It is, therefore, an object of the invention to disperse rubber in alcohol together with small portions of shellac or other suitable gum in order to make a cement.

In carrying out the above object, it is a further object to provide an alcoholic dispersion of rubber wherein shellac and rubber, in the form of reclaimed, crude or synthetic rubber are dispersed therein.

Another object of the invention is to form an alcoholic dispersion of rubber wherein the rubber is dispersed through the action of shellac or other gum as a dispersing agent.

Further objects and advantages of the present invention will be apparent from the following description.

Rubber dispersions have long been known as satisfactory cements. In all cases, however, these dispersions consist of rubber in the dispersed phase and water in the continuous phase. In this instance, some dispersing agent is used such as a soap which aids in dispersing the rubber and maintaining the dispersion.

This invention is directed in the main to a rubber dispersion wherein in place of water, alcohol is used as the continuous phase and wherein rubber is dispersed in the alcohol through the medium of an alcohol soluble dispersing agent such as shellac, gum pontianak or other alcohol soluble gums.

Any alcohol which is not solvent in character to rubber may be used, for example, methyl, ethyl, propyl and butyl alcohols have all been found satisfactory. Use of higher alcohols such as amyl, etc., and in fact up to octanol in supplementary amounts have been found to aid in the dispersion through a slight solvent action.

These higher alcohols, wherein the hydrocarbon radical includes more than four carbon atoms, act as dispersing agents, in combination with the gum. Increased quantities of the higher alcohols permit reduction in the quantity of gum utilized.

In order to make the cement, the solid ingredients and liquid dispersing agents are fed into an internal type mixer of the Werner Pfleiderer type wherein the materials are mixed together, after which alcohol is fed gradually into the mixer and the whole mass kneaded together. Additional alcohol is added as needed until the entire contents of the mixer is of the proper consistency.

Satisfactory cements were made using the following ingredients, wherein the rubber ingredient was reclaimed rubber, plasticized crude rubber and plasticized chloroprene. In each case, the dispersing agent was shellac and the vehicle for the dispersion was ethyl alcohol. In some cases, butanol was also added in lesser quantities. Compounding ingredients were added in the case of the plasticized crude rubber only.

The following representative formulas give three types of cement:

(1)

| | Parts |
|---|---|
| Whole tire reclaim | 60 |
| Shellac | 60 |
| Alcohol | 120 |

(2)

| | Parts |
|---|---|
| Plasticized crude rubber | 24 |
| Zinc oxide | 24 |
| Sym. di-beta-naphthyl-para-phenylenediamine | 12 |
| Sulfur | 240 |
| Shellac | 900 |
| Octanol | 36 |
| Butanol | 150 |
| Alcohol | 1600 |

(3)

| | Parts |
|---|---|
| Polychloroprene (Neoprene GN) | 600 |
| Shellac | 600 |
| Octanol | 35 |
| Butanol | 150 |
| Alcohol | 720 |

The octanol in the formulas two and three is used as a dispersing agent as previously set forth. However, the octanol is not a necessary ingredient to the success of the invention or to the dispersing of the rubber.

With crude rubber, as disclosed in formula No. 2, more solvent is required than in the other formulations, and this is probably due to the fact that the crude rubber is not as easily dispersed and requires more dispersing agent to complete the action.

All of the cements made by this method were good dispersions which held up. One of the main advantages of this cement is the quick drying properties of the dispersion. In other words, the main vehicle, ethyl alcohol, which may be replaced with any alcohol up to butanol is fast drying, due to the rapid rate of evaporation whereby the cement dries quicker than a water dispersed cement.

Another advantage is the possibility of mixing the rubber dispersion with alcohol solutions of other ingredients which form a hard cement layer after application. Then too, the shellac used as a dispersing agent, is a useful ingredient in cement in contrast to the dispersing ingredients used with aqueous dispersions. In use the cement is brushed or sprayed onto the parts to be joined and is preferably air dried, although curing at an elevated temperature may be utilized if desired in some cases.

In co-pending application filed concurrently herewith now designated as U. S. Serial No. 659,440, similar cements dispersed in alcohol are discussed wherein the dispersing agent is phenol formaldehyde resin in the unreacted phase.

While the form of embodiment as herein disclosed constitutes a preferred form, it is to be understood that other forms might be adopted, all coming within the scope of the claims which follow.

What is claimed is as follows:

1. A rubber cement, consisting essentially of, an alcoholic dispersion of reclaimed rubber in ethyl alcohol including shellac as a dispersing agent in quantities approximately equal to the quantity of reclaimed rubber.

2. A rubberlike cement consisting essentially of an alcoholic dispersion of rubberlike material taken from the class consisting of reclaimed rubber and polychloroprene and ethyl alcohol including shellac as a dispersing agent in quantities approximately equal to the quantity of the rubberlike material.

3. A polychloroprene cement consisting essentially of an alcoholic dispersion of polychloroprene in ethyl alcohol including shellac as a dispersing agent in quantities approximately equal to the quantity of polychloroprene.

STEWART L. BRAMS.

REFERENCES CITED

The following references are of record in the file of this patent:

UNITED STATES PATENTS

| Number | Name | Date |
|---|---|---|
| 1,467,356 | Cook | Sept. 11, 1923 |
| 1,916,421 | Hazell | July 4, 1933 |
| 1,967,863 | Collins et al. | July 24, 1934 |
| 2,110,539 | Weiss | Mar. 8, 1938 |
| 2,265,777 | Merrill | Dec. 9, 1941 |
| 2,376,854 | Saunders | Mar. 22, 1945 |
| 2,433,656 | Egan et al. | Dec. 30, 1947 |

FOREIGN PATENTS

| Number | Country | Date |
|---|---|---|
| 239,048 | Great Britain | Sept. 3, 1925 |

OTHER REFERENCES

Australian Dewey and Almy Chem. Co. 109–746, Feb. 22, 1940, 6 pages.